United States Patent
Nagarajan et al.

(10) Patent No.: US 7,882,185 B2
(45) Date of Patent: Feb. 1, 2011

(54) METHOD AND APPARATUS FOR MANAGING E-MAIL ATTACHMENTS

(75) Inventors: Sai Sivakumar Nagarajan, Karnataka (IN); Sriram M. Ramanathan, Morrisville, NC (US); George Francis Ramsay, III, Elgin, TX (US); Anandha S. Srinivasan, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 11/535,116

(22) Filed: Sep. 26, 2006

(65) Prior Publication Data

US 2008/0077676 A1     Mar. 27, 2008

(51) Int. Cl.
    *G06F 15/16*    (2006.01)
(52) U.S. Cl. ....................... 709/206; 709/200
(58) Field of Classification Search ................. 709/206, 709/213
    See application file for complete search history.

(56) References Cited

U.S. PATENT DOCUMENTS

| | | | |
|---|---|---|---|
| 5,781,901 A * | 7/1998 | Kuzma ........................ 707/10 |
| 6,275,848 B1 | 8/2001 | Arnold | |
| 6,327,612 B1 | 12/2001 | Watanabe | |
| 6,505,236 B1 * | 1/2003 | Pollack ........................ 709/206 |
| 6,546,417 B1 * | 4/2003 | Baker ........................ 709/206 |
| 6,598,076 B1 * | 7/2003 | Chang et al. ................. 709/206 |
| 6,687,741 B1 * | 2/2004 | Ramaley et al. ............. 709/206 |
| 6,721,784 B1 * | 4/2004 | Leonard et al. ............. 709/206 |
| 6,915,333 B2 * | 7/2005 | Delia et al. ................. 709/206 |
| 7,003,551 B2 * | 2/2006 | Malik ........................ 709/206 |
| 7,107,276 B2 * | 9/2006 | Johnson, Jr. ................. 707/100 |
| 7,130,885 B2 * | 10/2006 | Chandra et al. ............. 709/206 |
| 7,209,953 B2 * | 4/2007 | Brooks ........................ 709/206 |
| 7,243,298 B2 * | 7/2007 | Yozell-Epstein et al. .... 715/273 |
| 7,290,034 B2 * | 10/2007 | Budd et al. ................. 709/206 |
| 7,299,256 B2 * | 11/2007 | Pradhan et al. ............. 709/203 |
| 7,409,425 B2 * | 8/2008 | Naick et al. ................. 709/206 |
| 7,428,578 B1 * | 9/2008 | Hull et al. ................... 709/206 |

(Continued)

FOREIGN PATENT DOCUMENTS

CN    1392989 A    1/2003

(Continued)

OTHER PUBLICATIONS

U.S. Appl. No. 11/101,131, filed Apr. 3, 2005, Couper et al.

(Continued)

*Primary Examiner*—John Follansbee
*Assistant Examiner*—Anthony Mejia
(74) *Attorney, Agent, or Firm*—Yee & Associates, P.C.; Matthew W. Baca

(57) ABSTRACT

A computer implemented method, apparatus, and computer usable program code for managing e-mail attachments. A determination is made as to whether a unique identifier is present in an e-mail message, wherein the unique is associated with an e-mail attachment in response to receiving the e-mail message from a client for delivery to a recipient. The e-mail attachment is attached to the e-mail message in response to the unique identifier being present. The e-mail message is sent with the e-mail attachment to the recipient.

20 Claims, 4 Drawing Sheets

U.S. PATENT DOCUMENTS

| | | | |
|---|---|---|---|
| 7,451,187 B2* | 11/2008 | Malik et al. | 709/206 |
| 7,500,004 B1* | 3/2009 | Homer | 709/228 |
| 2001/0051991 A1* | 12/2001 | Beyda et al. | 709/206 |
| 2002/0010748 A1* | 1/2002 | Kobayashi et al. | 709/206 |
| 2002/0049836 A1* | 4/2002 | Shibuya | 709/219 |
| 2002/0059384 A1* | 5/2002 | Kaars | 709/206 |
| 2002/0065892 A1* | 5/2002 | Malik | 709/206 |
| 2002/0091772 A1* | 7/2002 | Yong | 709/206 |
| 2002/0147780 A1* | 10/2002 | Liu et al. | 709/206 |
| 2002/0198944 A1* | 12/2002 | Moss | 709/206 |
| 2003/0041112 A1* | 2/2003 | Tada et al. | 709/206 |
| 2003/0055907 A1* | 3/2003 | Stiers | 709/206 |
| 2003/0115273 A1* | 6/2003 | Delia et al. | 709/206 |
| 2003/0115277 A1* | 6/2003 | Watanabe et al. | 709/207 |
| 2004/0024826 A1* | 2/2004 | Halahmi et al. | 709/206 |
| 2004/0034688 A1* | 2/2004 | Dunn | 709/206 |
| 2004/0158607 A1* | 8/2004 | Coppinger et al. | 709/206 |
| 2004/0172451 A1* | 9/2004 | Biggs et al. | 709/206 |
| 2004/0199587 A1* | 10/2004 | McKnight | 709/206 |
| 2005/0050149 A1* | 3/2005 | Takashima | 709/206 |
| 2005/0060375 A1 | 3/2005 | Ernest et al. | |
| 2005/0091324 A1* | 4/2005 | Flocken | 709/206 |
| 2005/0108335 A1* | 5/2005 | Naick et al. | 709/206 |
| 2005/0160149 A1* | 7/2005 | Durand et al. | 709/206 |
| 2005/0188026 A1* | 8/2005 | Hilbert et al. | 709/206 |
| 2005/0193070 A1* | 9/2005 | Brown et al. | 709/206 |
| 2005/0257159 A1* | 11/2005 | Keohane et al. | 715/752 |
| 2006/0031309 A1 | 2/2006 | Luoffo et al. | |
| 2006/0168012 A1* | 7/2006 | Rose et al. | 709/206 |
| 2006/0168016 A1* | 7/2006 | Barrett | 709/206 |
| 2006/0195526 A1* | 8/2006 | Lederer et al. | 709/206 |
| 2006/0218234 A1* | 9/2006 | Deng et al. | 709/206 |
| 2006/0271631 A1* | 11/2006 | Qureshi et al. | 709/206 |
| 2007/0016613 A1* | 1/2007 | Foresti et al. | 707/104.1 |
| 2007/0016644 A1* | 1/2007 | Corona | 709/206 |
| 2007/0022166 A1* | 1/2007 | Bhogal et al. | 709/206 |
| 2007/0033588 A1* | 2/2007 | Landsman | 717/178 |
| 2007/0180035 A1* | 8/2007 | Liu et al. | 709/206 |
| 2007/0250583 A1* | 10/2007 | Hardy et al. | 709/206 |
| 2007/0263259 A1* | 11/2007 | Yoshimura | 358/402 |
| 2007/0266102 A1* | 11/2007 | Heix et al. | 709/206 |
| 2007/0271344 A1* | 11/2007 | Danasekaran et al. | 709/206 |
| 2008/0005250 A1* | 1/2008 | Oksum | 709/206 |
| 2008/0077676 A1* | 3/2008 | Nagarajan et al. | 709/206 |
| 2008/0098078 A1* | 4/2008 | Daniell | 709/206 |
| 2008/0189373 A1* | 8/2008 | Ikonen et al. | 709/206 |
| 2008/0228892 A1* | 9/2008 | Staack et al. | 709/206 |
| 2009/0030997 A1* | 1/2009 | Malik | 709/206 |
| 2009/0037762 A1* | 2/2009 | Gozzo et al. | 714/2 |
| 2009/0222450 A1* | 9/2009 | Zigelman | 707/10 |
| 2010/0042698 A1* | 2/2010 | Burns et al. | 709/206 |

FOREIGN PATENT DOCUMENTS

| | | |
|---|---|---|
| WO | WO 03/036492 A1 | 5/2003 |
| WO | WO 2004/084112 A1 | 9/2004 |

OTHER PUBLICATIONS

U.S. Appl. No. 11/325,022, filed Jan. 3, 2005, Gerstl et al.
Office Action from China Patent Office dated Dec. 11, 2009.
China Patent Office action Jul. 16, 2010.
"Clever transmission of large files -sharing a new coup", China Academic Journal Electronic Publishing House, Apr. 30, 2004, pp. 13-15.

* cited by examiner

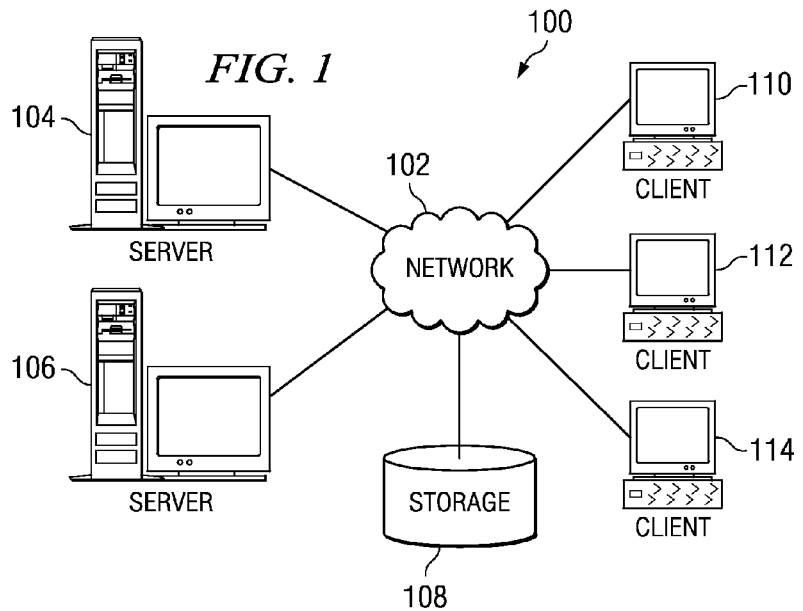

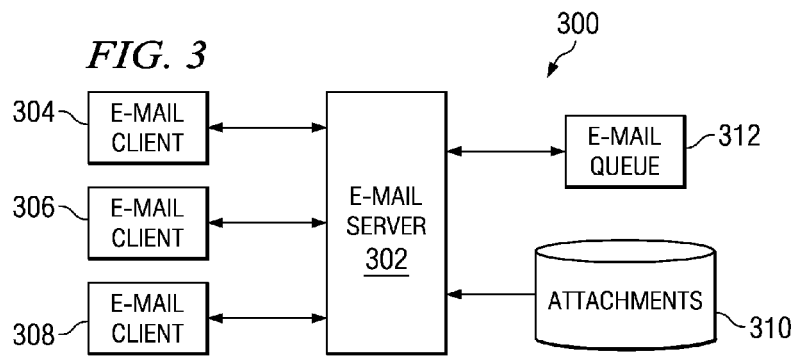
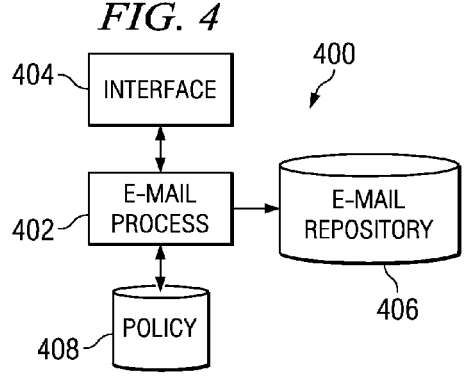
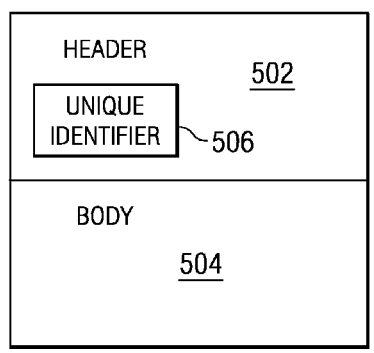
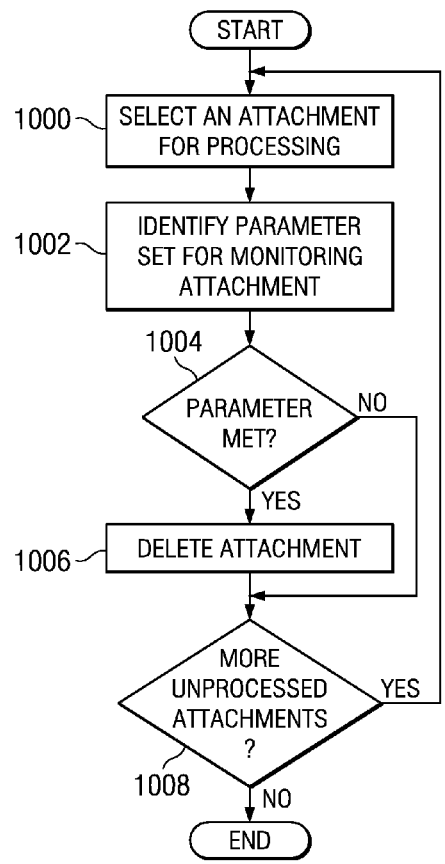

METHOD AND APPARATUS FOR MANAGING E-MAIL ATTACHMENTS

BACKGROUND OF THE INVENTION

1. Field of the Invention

The present invention relates generally to an improved data processing system and in particular to a method and apparatus for processing messages. Still more particularly, the present invention relates to a computer implemented method, apparatus, and computer usable program code for managing attachments for electronic mail messages.

2. Description of the Related Art

Electronic mail involves composing, sending, storing, and receiving messages over a network, such as the Internet. Electronic mail is also referred to as e-mail. E-mail has become a common form of communication for many people and is used for both personal and business purposes. Businesses often rely on e-mail messages to quickly send information. Oftentimes, the information may be sent in the form of attachments to e-mail messages. Users may access e-mail messages though a dedicated e-mail application, such as Lotus Notes or Microsoft Outlook. Lotus Notes is a product available from International Business Machines Corporation, and Microsoft Outlook is a product available from Microsoft Corporation. Users also may access e-mail messages through Web based interfaces using a program, such as a browser.

With the use of e-mail messages as a day to day means of communicating and sharing data in both personal and business environments, users often include attachments as part of these communications. These attachments take many forms. For example, the attachments are files, such as pictures, spreadsheets, or other types of documents. With respect to business users, these documents may be, for example, advertisements, contracts, financial spreadsheets, or any other type of document containing business information.

Currently, a file, such as a document or spreadsheet, is attached to an e-mail message as an attachment that is uploaded to an e-mail server from a client at which the e-mail message is composed. Oftentimes, a user will send e-mail messages with attachments to different recipients separately. For example, a user seeking a position may send a resume document as an attachment to hundreds of different potential employers. This type of communication requires the user to re-attach the same document over and over again. Other examples of documents that may be attached many times include, for example, profiles, advertisement documents, and technical specifications.

Each time a new e-mail message is sent, the attachment must be re-attached to the e-mail and uploaded to the server for distribution to the recipient. Such a process uses network resources and may result in a severe penalty with respect to bandwidth use for users sending e-mail messages over the Internet.

Currently, solutions for handling frequently used e-mail attachments include storing the attachment in a place accessible to the recipients. The attachments typically stored on the Internet and a locator, such as a universal resource locator, is sent in the e-mail message in place of the attachment. With this type of solution, the repeated transfer of the attachment from the e-mail client to the e-mail server is eliminated. Further, this type of solution allows users to re-use an attachment stored on a remote location with the user only having to send the same locator when the same attachment is to be sent.

One problem with this type of solution is that the solution requires a recipient to go outside of the e-mail framework and rely on the existence of other file storing or file sharing mechanisms. The file storing or sharing mechanism is not always available for all users. Another problem with this type of solution is that many organizations restrict the manner in which the Internet may be accessed by users. Mechanisms, such as firewalls, proxy servers, and Internet Protocol security policies may restrict certain protocols, ports, and Websites.

As a result, the universal resource locator in the e-mail message may not be accessible by all recipients of the message when they receive the e-mail message. Further, the universal resource locator to specific storage locations may be prohibited because such a solution is outside of the e-mail framework. This kind of prohibition is often enforced through security policies. As a result, this type of solution is not feasible in all instances.

SUMMARY OF THE INVENTION

The present invention provides a computer implemented method, apparatus, and computer usable program code for managing e-mail attachments. A determination is made as to whether a unique identifier is present in an e-mail message, wherein the unique identifier is associated with an e-mail attachment in response to receiving the e-mail message from a client for delivery to a recipient. The e-mail attachment is attached to the e-mail message in response to the unique identifier being present. The e-mail message is sent with the e-mail attachment to the recipient.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which illustrative embodiments may be implemented;

FIG. 2 is a block diagram of a data processing system shown in which illustrative embodiments may be implemented;

FIG. 3 is a diagram illustrating components used in processing e-mail messages in accordance with an illustrative embodiment;

FIG. 4 is a diagram illustrating an e-mail client in accordance with an illustrative embodiment;

FIG. 5 is a diagram illustrating an e-mail message in accordance with an illustrative embodiment;

FIG. 10 is a flowchart of a process for managing attachments in accordance with an illustrative embodiment.

DETAILED DESCRIPTION OF THE PREFERRED EMBODIMENT

Figure 6:
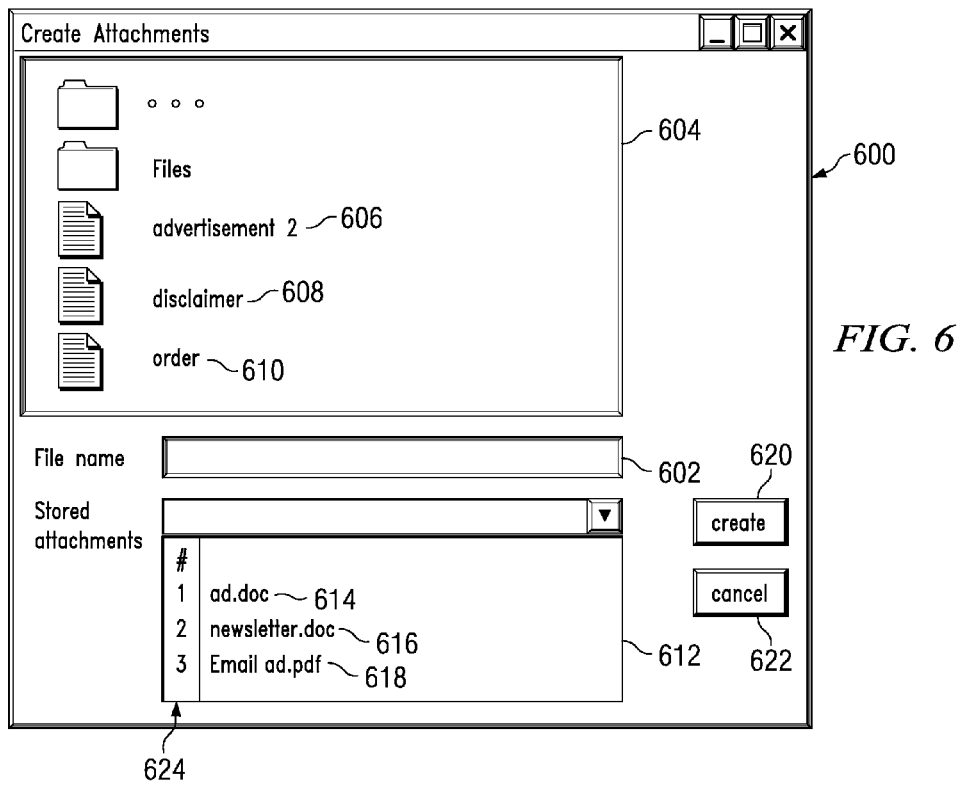
FIG. 6 is a diagram illustrating a user interface for adding attachments to an e-mail message in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Server 104 and server 106 may include e-mail server processes for handling and distributed e-mail messages to and from e-mail client applications running on clients 110, 112, and 114. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, apparatus, and computer user program code for managing e-mail attachments. A determination is made as to whether a unique identifier is present when an e-mail message is received from a client for delivery to one or more recipients. In these examples, the unique identifier is one associated with an e-mail attachment. If this unique identifier is present, the e-mail attachment is located and attached to the e-mail message. The e-mail message is then sent to the recipients with the attachment.

In the illustrative examples, multipurpose internet mail extensions (MIMEs) may be used along with a storage facility used by the e-mail server to store frequently attached files. For example, as a file is uploaded, the e-mail server stores this file in the storage facility. From this point on, the index of that document with the MIME extension is used to identify that attachment uniquely. For example, when the user wants to attach a document, which is located in a remote storage facility, only the index of that attachment is inserted along with the MIME extension in the e-mail message in these illustrative examples.

In this manner, attachments that are frequently sent may be sent to the server once by a user friendly e-mail client. Subsequent e-mail messages containing the identifier for the attachment results in the server attaching the file when sending these e-mail messages to different recipients. As a result, the e-mail messages actually contain an attachment rather than just a locator with current solutions. Thus, problems encountered with different companies or business policies are avoided because the different processes and illustrative embodiments are contained within the e-mail framework.

Turning now to FIG. 3, a diagram illustrating components used in processing e-mail messages is depicted in accordance with an illustrative embodiment. In these examples, the different processes and components of the present invention may be implemented in e-mail system 300. E-mail system 300 contains e-mail server 302, e-mail client 304, e-mail client 306, and e-mail client 308.

E-mail server 302 is a server process that may run on a computer, such as server 104 or 106 in FIG. 1. E-mail server 302 is a typical e-mail server process provided by different organizations to provide e-mail service to users. E-mail server 302 receives e-mail messages and distributes them to other e-mail servers and/or to clients.

E-mail clients 304, 306, and 308 are software processes that may run on client computers such as client 110 or 112 in FIG. 1. E-mail clients 304, 306, and 308, may take various forms. For example, these clients may be e-mail applications, such as Microsoft Outlook or Lotus Notes. Lotus Notes is a product available from International Business Machines Corporation, and Microsoft Outlook is a product available from Microsoft Corporation. Additionally, these clients also may take the form of a Web based client in which the e-mail is accessed through a browser program.

E-mail server 302 typically sends messages using simple mail transfer protocol (SMTP), which is a protocol for transmission of e-mail messages across the Internet. E-mail clients 304, 306, and 308 may retrieve e-mail messages from e-mail server 302 using protocols, such as post office protocol version 3 (POP3) or Internet message access protocol (IMAP).

In this example, a user in e-mail client 306 may upload an attachment to e-mail server 302. This attachment is stored in attachments 310. When the user at e-mail client 306 generates an e-mail message, the user may indicate that a stored attachment is to be included with this e-mail message. When that e-mail message is sent to e-mail server 302, the e-mail message is placed into e-mail queue 312.

In processing the e-mail messages for delivery to recipients, e-mail server 302 determines whether a unique identifier indicating that an attachment is to be included is present in the e-mail messages in e-mail queue 312. If this unique identifier is found in the e-mail message, attachment, associated with the unique identifier, is located in attachments 310 and attached to the e-mail message when the e-mail message is distributed to a recipient.

When a user uploads an attachment to e-mail server 302 for storage in attachments 310, the attachment is stored in association with a unique identifier. In these examples, the attachment storage in attachments 310 may be assigned to a user in a manner that is unique to the user. In such a case, this storage may be a simple mail document which is kept invisible to the user and may hold the multiple attachments that are uploaded to e-mail server 302. The unique identifier could be the index value of that file in the list of attachments that are there in the attachment storage. In other instances, the unique identifier may be unique to all users of e-mail server 302. The unique identifier may take various forms. For example, the unique identifier may be a Universal Unique ID (UUID) with the name of the file and with the appropriate MIME extension.

Attachments 310 in these examples may be located on the same physical computer as e-mail server 302. Depending on the particular implementation, attachments 310 may be located on a different computer accessed by e-mail server 302.

This storage is used to store attachments. Typically, one attachment may be stored per user with additional attachments depending on the particular implementation and needs of users. As the user attaches the file to an e-mail message, using an interface, the attachment is added to the storage. When the user elects to attach a document from the server, the e-mail client automatically adds a specific MIME entry in the e-mail message encoding the index value of the attachment selected by the user. This operation remains transparent to the user.

Turning now to FIG. 4, a diagram illustrating an e-mail client is depicted in accordance with an illustrative embodiment. As illustrated, e-mail client 400 is a more detailed example of an e-mail client, such as e-mail client 304 in FIG. 3.

In this example, e-mail process 402 receives messages from an e-mail server and processes those messages for display to a user on interface 404. As depicted, interface 404 is a graphical user interface (GUI) presented to the user to view, manipulate, and create e-mail messages.

E-mail repository 406 serves as a location in which received e-mail messages are stored. The e-mail messages located in e-mail repository 406 may be grouped into different folders depending on user preferences. Typically, e-mail repository 406 contains an inbox, a sent folder, and a trash bin. Of course, other folders may be created by the user to store or handle e-mail messages received through e-mail process 402.

In these examples, policy 408 contains rules used to process e-mail messages when they are received by e-mail process 402. When an e-mail message is received by e-mail process 402, e-mail process 402 determines whether a rule is present in policy 408. If one or more rules are present in policy 408, e-mail process 402 determines whether any of these rules apply to the received e-mail message.

These rules may take various forms. For example, a rule may be present in policy 408 that any message from a particular sender is stored in a selected folder rather than the inbox. Another rule may define spam and any e-mail meeting this rule is placed in this folder or a trash bin. Interface 404 provides a graphical user interface to the user for composing e-mail messages and uploading attachments using the different processes in the depicted examples.

In these illustrative examples, the user may designate e-mail messages, through interface 404, as having an attachment that is stored remotely by an e-mail server through interface 404 in these examples. The user may also use interface 404 to upload attachments to an e-mail server for later attachment to e-mail messages.

Turning now to FIG. 5, a diagram illustrating an e-mail message is depicted in accordance with an illustrative embodiment. E-mail message 500 is an example of an e-mail message that may be received and processed by e-mail client 400 in FIG. 4. In this example, e-mail message 500 includes header 502 and body 504.

The contents of header 502 are defined by various currently used standards for transmitting e-mail messages. Body 504 contains the text entered by the user for the e-mail message. Body 504 may also include graphics or links depending on the particular implementation. Typically, header 502 includes transmission information and recipient information. The transmission information includes, for example, the identifiers for the recipients and sender of the e-mail message. The recipient information may include, for example, the timestamp, reply address, and a subject line. In particular, the recipient information includes unique identifier 506.

In these illustrative embodiments, unique identifier 506 identifies an attachment that is to be included with e-mail message 500, when e-mail message 500 is distributed to recipients by an e-mail server. The e-mail server removes unique identifier 506 before distributing e-mail message 500 to the recipients in these illustrative embodiments. The attachment is not attached to e-mail message 500 by an e-mail client in these examples. The bandwidth issues incurred by uploading the attachments from the e-mail client to the e-mail server are avoided.

Turning now to FIG. 6, a diagram illustrating a user interface for adding attachments to an e-mail message is depicted in accordance with an illustrative embodiment. In this example, user interface 600 is an example of a graphical user interface that may be presented by an interface, such as interface 404 in FIG. 4.

In this example, user interface 600 is used to create attachments for an e-mail message. The user may designate a filename in field 602 to add attachments. Additionally, the user may select attachments from section 604. In these examples, the attachments in section 604 include, for example, advertisement 606, disclaimer 608, and order 610. These attachments are examples of attachments located locally with the e-mail client.

User interface 600 allows the user to see what attachments are stored for that user at an e-mail server. In this example, these types of stored attachments are found in field 612. In these examples, the attachments include ad.doc 614, newsletter.doc 616, and e-mail ad.pdf 618. These are examples of attachments stored remotely by the e-mail server. The user may select one of these attachments from field 612 and select create button 620 to include the unique identifier in the e-mail message. The unique identifier identifies the particular attachment selected by the user and is used by the server to attach the document when the e-mail message is received by the server for distribution.

Additionally, the user may also attach locally stored attachments in addition to those stored at the e-mail server to form a mixed set of attachments, depending on the particular implementation. If the user does not wish to add attachments, the user may select cancel button 622.

In these examples, the unique identifier takes the form of a tag, such as a MIME tag, that is unique and known between the client and server. Also, in these depicted examples, column 624 contains indexes for attachments as.doc 614, newsletter.doc 616 and e-mail ad.pdf 618. These indexes are the indexes used by the e-mail server to store the attachments uniquely for a particular user. Although the indexes are shown as single numeric characters any alpha-numeric or other characters may be used to uniquely identify the attachments.

Figure 7:
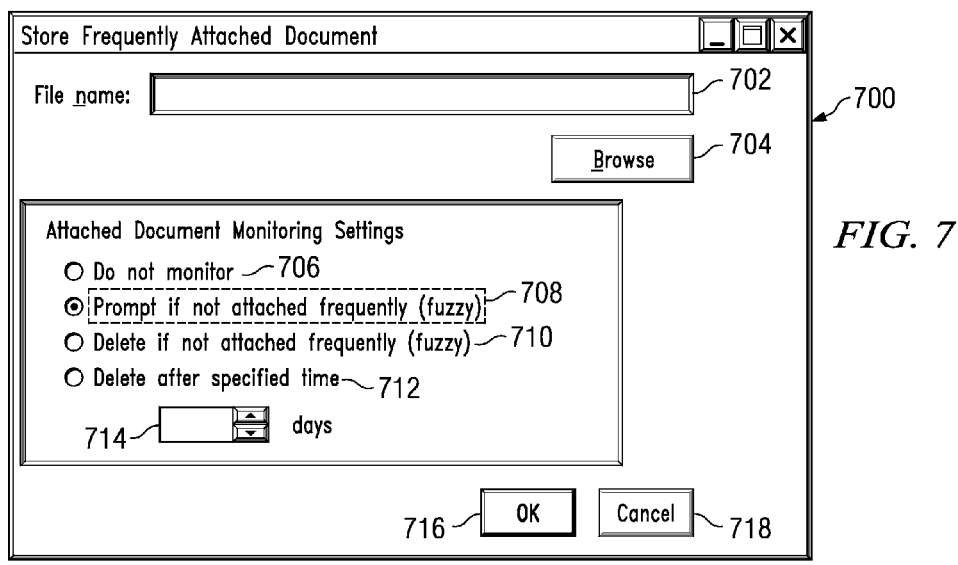
FIG. 7 is a diagram illustrating an interface for uploading attachments to an e-mail server in accordance with an illustrative embodiment.

Turning now to FIG. 7, a diagram illustrating an interface for uploading attachments to an e-mail server is depicted in accordance with an illustrative embodiment. In this example, user interface 700 is an example of a user interface that may be presented through interface 404 in FIG. 4. The user may designate a particular file to be sent to the e-mail server as an attachment by entering that file name in field 702. Additionally, the user may browse or look for particular file names by selecting browse button 704.

Once the user has located the particular file for attachment, the user also may include various parameters as to how the attachments are to be handled. In these depicted examples, those parameters include "do not monitor" 706, "prompt if not attached frequently" 708, "delete if not attached frequently" 710, and "delete after a specified time" 712. The specified time is entered in days/months and entered in field 714 if "delete after a specified time" 712 is selected. "Do not monitor" 706 is a parameter that relates to the usage frequency of an attachment. By selecting this particular parameter, the attachment remains in storage on the e-mail server until the user manually removes this particular attachment from storage. The other parameters provide for removing the attachment after some event, such as a period of time, a specified date, or some amount of usage occurs.

In this particular example, the user has selected "prompt if not attached frequently" 708. Use of this parameter results in a prompt or message being sent to the user to indicate that the attachment has not been attached to the e-mail message as more than some selected threshold. The threshold used depends on the particular implementation and may be calculated using different mechanisms.

When the file has been selected and a parameter has been selected, the file may be uploaded to the server by selecting "OK" button 716. The process may be stopped without uploading the attachment by selecting cancel button 718.

Figure 8:
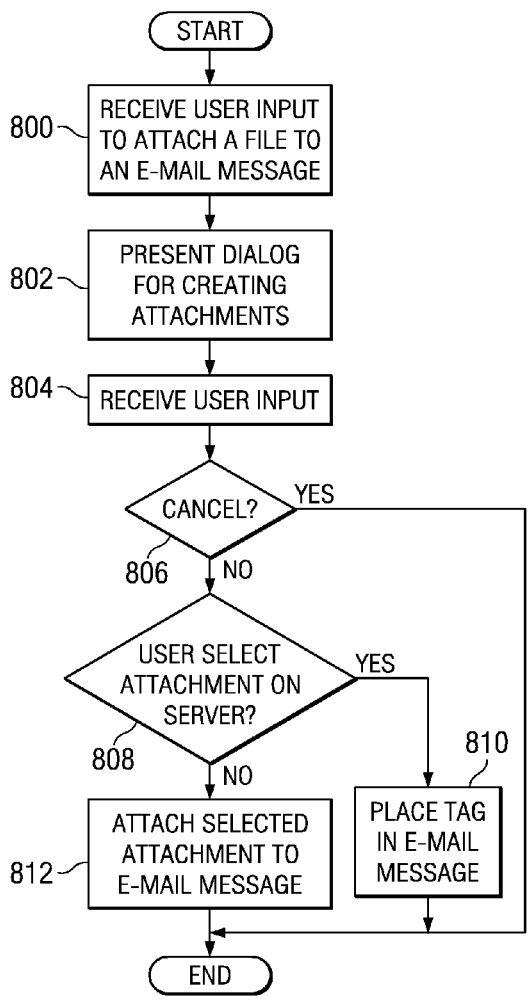
FIG. 8 is a flowchart of a process for creating an e-mail message in accordance with an illustrative embodiment.

Turning now to FIG. 8, a flowchart of a process for creating an e-mail message is depicted in accordance with an illustrative embodiment. The process illustrated in FIG. 8 may be implemented in an e-mail client, such as e-mail client 306 in FIG. 3.

The process begins with the user receiving input to attach a file to an e-mail message (step 800). Next, a dialog is presented for creating attachments (step 802) and user input is received (step 804).

The process makes a determination as to whether the user input is to cancel the process (step 806). If the process determines the action is cancelled in step 806, the process terminates. If the process determines not to cancel the process in step 806, the process further determines if a user has selected an attachment on a server (step 808).

If the process determines the user has selected an attachment on the server in step 808, a tag or other type of identifier is placed in an e-mail message (step 810), with the process terminating thereafter. If the process determines the user has not selected an attachment on the server in step 808, the selected attachment is attached to an e-mail message at the client (step 812) with the process terminating thereafter.

Figure 9:
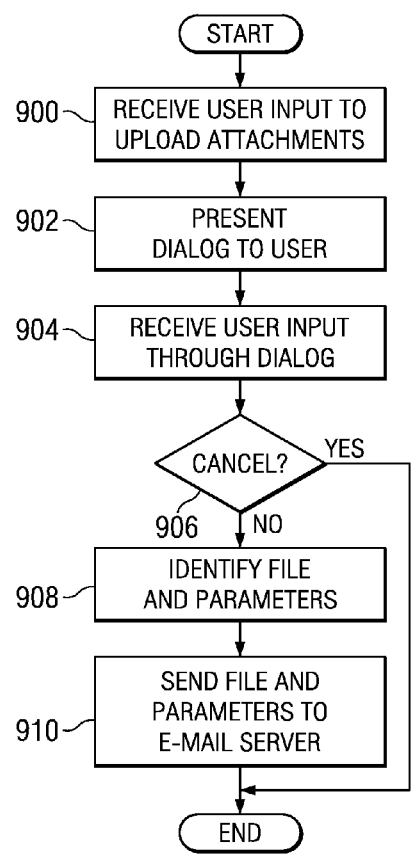
FIG. 9 is a flowchart of a process for uploading attachments in accordance with an illustrative embodiment.

Turning now to FIG. 9, a flowchart of a process for uploading attachments is depicted in accordance with an illustrative embodiment. The process illustrated in FIG. 9 may be implemented in an e-mail lent, such as e-mail client 306 in FIG. 3.

The process begins by receiving user input to upload attachments (step 900). Next, a dialog is presented to the user (step 902). User input is then received through the dialog (step 904).

The process determines if the action is to be cancelled (step 906). If the process determines the action is to be cancelled in step 906, the process terminates. If the process determines the action is not to be cancelled in step 906, the process identifies the file and parameters (step 908). Next, the process sends file and parameters to e-mail server (step 910) with the process terminating thereafter.

Turning now to FIG. 10, a flowchart of a process for managing attachments is depicted in accordance with an illustrative embodiment. The process illustrated may be implemented in an e-mail server, such as e-mail server 302 in FIG. 3.

The process begins by selecting an attachment for processing (step 1000). This attachment is selected for a set of attachments for a particular user or alternatively for all users depending on the particular implementation. The process then identifies the parameter set for monitoring the attachment (step 1002). These parameters may include the ones illustrated in FIG. 7.

Thereafter, a determination is made as to whether the parameter for the attachment has been met (step 1004). This determination is made a number of different ways. The determination made varies depending on the particular parameter. For example, if the parameter is a "do not monitor" parameter, then no further processing is needed and the parameter is not met because the user manually removes the attachment with this type of parameter.

If the parameter is, for example, "delete if not attached frequently", a determination may be made as to whether the attachment has been frequently attached. This determination may be made, for example, by finding the average of the frequencies for all of the attachments in the storage and identify if the attachment frequency of the attachment being processed is less than the average frequency for all of the attachments. If the attachment frequency of the attachment is less than the average value, the attachment is considered to be not attached frequently, in these examples. As another example, if the parameter is delete after a specified time, a determination is made as to whether a time specified for the attachment has elapsed.

If the parameter is met, the attachment is deleted (step 1006). Thereafter, a determination is made as to whether additional unprocessed attachments are present (step 1008). If additional unprocessed attachments are present, the process returns to step 1000 to select another attachment for processing. Otherwise, the process terminates.

In these examples, the file management features are implemented if parameters are passed to the e-mail server from the client. The parameters are encoded as part of the MIME extension. If parameters are not passed, file management also may be implemented by having the user set parameters for the files after the files have been uploaded through a user interface. Further, file management may be selectively enabled depending on the amount of storage space used. For example, if the total size of the stored attachments is bigger than a selected value, such as twenty percent of the total e-mail storage offered by the e-mail server for user, then the process illustrated in FIG. 10 may be initialized.

Thus, the present invention provides a computer implemented method, apparatus, and computer usable program code for managing e-mail attachments. In these depicted examples, a determination is made as to whether a unique identifier is present in an e-mail message, wherein the unique is associated with an e-mail attachment in response to receiving the e-mail message from a client for delivery to a recipient. The e-mail attachment is attached to the e-mail message in response to the unique identifier being present. The e-mail message is sent with the e-mail attachment to the recipient. In this manner the repeated transfer of an e-mail attachment from a client to a server in subsequent e-mail messages is avoided through having the attachment stored in a remote location from the client e-mail application in a manner accessible by an e-mail server.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing e-mail attachments, the computer implemented method comprising:

uploading a file for use as an e-mail attachment from a client to an e-mail server, wherein the file for use as an e-mail attachment is uploaded independent of any particular e-mail message;

storing the file for use as an e-mail attachment, wherein a unique identifier is associated with the file for use as an e-mail attachment;

presenting, at the client, a list of e-mail attachments stored on an e-mail server in communication with the particular client through a communications link;

responsive to a selection at the client of the file for use as an e-mail attachment from the list of e-mail attachments, placing the unique identifier associated with the file for use as an e-mail attachment in the particular e-mail message before the e-mail message is sent from the client to the e-mail server, wherein the file for use as an e-mail attachment was previously uploaded from the client;

sending a particular e-mail message from the client to the e-mail server, for subsequent delivery to a recipient, wherein the file for use as an e-mail attachment is absent from the e-mail message sent from the client to the e-mail server;

responsive to receiving the particular e-mail message at the e-mail server, operating the e-mail server to determine whether the unique identifier is present in the received e-mail message;

responsive to the unique identifier being present, attaching the file for use as an e-mail attachment to the particular e-mail message at the e-mail server;

further operating the e-mail server to send the particular e-mail message with the file for use as an e-mail attachment from the e-mail server to the recipient; and removing the unique identifier from the particular e-mail message at the e-mail server, before sending the particular e-mail message to the recipient.

2. The computer implemented method of claim 1 further comprising:

sending the particular e-mail message with the unique identifier from the particular client to the e-mail server for distribution, wherein the unique identifier is a multipurpose internet mail extension (MIME) identifier.

3. The computer implemented method of claim 1 further comprising:

sending the file for use as an e-mail attachment from the client to the e-mail server, prior to creating the particular e-mail message containing the unique identifier at the client, wherein the client supports the MIME;

associating the file for use as an e-mail attachment with the unique identifier at the server; and storing the file for use as an e-mail attachment on the e-mail server for later attachment to the e-mail message when the e-mail message is received from the client.

4. The computer implemented method of claim 3, wherein the file for use as an e-mail attachment stored on the e-mail server is deleted therefrom, in response to determining that an event associated with the file for use as an e-mail attachment has occurred, wherein said event is selected from a group that includes at least reaching a prespecified date, reaching a prespecified amount of usage, and failing to comply with a prespecified criterion.

5. The computer implemented method of claim 2, wherein a user is located at the client and wherein the presenting step comprises:

identifying all e-mail attachments associated with the user to form the list of e-mail attachments, wherein each e-mail attachment is associated with a corresponding unique identifier; and sending the list of e-mail attachments to one or more clients.

6. The computer implemented method of claim 5 further comprising:

responsive to a selection of a file for use as an e-mail attachment from the list of e-mail attachments, identifying an associated unique identifier for the particular e-mail message; and placing the associated unique identifier in the particular e-mail message.

7. The computer implemented method of claim 1, wherein the receiving, attaching, and sending steps are performed by the e-mail server.

8. A computer program product for managing e-mail attachments comprising:

a non-transitory computer readable medium having computer usable program code for executing instructions, the computer program medium comprising:

computer usable program code for uploading a file for use as an e-mail attachment from a client to an e-mail server, wherein the file for use as an e-mail attachment is uploaded independent of any particular e-mail message;

computer usable program code for storing the file for use as an e-mail attachment, wherein a unique identifier is associated with the file for use as an e-mail attachment;

computer usable program code for presenting, at the client, a list of e-mail attachments stored on an e-mail server in communication with the client through a communications link;

computer usable program code for responsive to a selection at the client of the file for use as an e-mail attachment from the list of e-mail attachments, placing the unique identifier associated with the file for use as an e-mail attachment in the particular e-mail message before the e-mail message is sent from the client to the e-mail server, wherein the file for use as an e-mail attachment was previously uploaded from the client;

computer usable program code for sending a particular e-mail message from the client to the e-mail server, for subsequent delivery to a recipient, wherein the file for use as an e-mail attachment is absent from the e-mail message sent from the client to the e-mail server;

computer usable program code, responsive to receiving the particular e-mail message at the e-mail server, for operating the e-mail server to determine whether the unique identifier is present in the received e-mail message;

computer usable program code, responsive to the unique identifier being present, for attaching the file for use as an e-mail attachment to the particular e-mail message at the e-mail server;

computer usable program code for operating the e-mail server to send the particular e-mail message with the file for use as an e-mail attachment from the e-mail server to the recipient; and computer usable program code for removing the unique identifier from the particular e-mail message at the e-mail server before sending the particular e-mail message to the recipient.

9. The computer program product of claim 8 further comprising:

computer usable program code for sending the e-mail message with the unique identifier to the e-mail server for distribution, wherein the e-mail attachment is absent from the e-mail message being sent to the e-mail server.

10. The computer program product of claim 8 further comprising:

computer usable program code for receiving the e-mail attachment at an e-mail server prior to creating an e-mail message containing the unique identifier;

computer usable program code for associating the e-mail attachment with the unique identifier; and storing the e-mail attachment on the e-mail server for later attachment to the e-mail message when the e-mail message is received from the client.

11. The computer program product of claim 10, wherein the e-mail attachment is stored on a same data processing system as the e-mail server.

12. The computer program product of claim 9, wherein a user is located at the client and wherein the computer usable program code for presenting, at the client, a list of e-mail attachments stored on an e-mail server in communication with the client through a communications link comprises:

computer usable program code for identifying all e-mail attachments associated with the user to form the list of e-mail attachments, wherein each e-mail attachment is associated with a corresponding unique identifier; and computer usable program code for sending the list of e-mail attachments to the client.

13. The computer program product of claim 12 further comprising:
> computer usable program code, responsive to a selection of a file for use as an e-mail attachment from the list of e-mail attachments, for identifying an associated unique identifier for the particular e-mail message; and
> computer usable program code for placing the associated unique identifier in the particular e-mail message.

14. The computer program product of claim 8, wherein the receiving, attaching, and sending steps are performed by the e-mail server.

15. A data processing system comprising:
> a bus;
> a communications unit connected to the bus;
> a storage device connected to the bus, wherein the storage device includes computer usable program code; and
> a processor unit connected to the bus, wherein the processor unit executes the computer usable program code to upload a file for use as an e-mail attachment from a client to an e-mail server, wherein the file for use as an e-mail attachment is uploaded independent of any particular e-mail message; store the file for use as an e-mail attachment, wherein a unique identifier is associated with the file for use as an e-mail attachment; present, at the client, a list of e-mail attachments stored on an e-mail server in communication with the client through a communications link, responsive to a selection at the client of the file for use as an e-mail attachment from the list of e-mail attachments, place the unique identifier associated with the file for use as an e-mail attachment in the particular e-mail message before the e-mail message is sent from the client to the e-mail server, wherein the file for use as an e-mail attachment was previously uploaded from the client, send a particular e-mail message from the client to the e-mail server, for subsequent delivery to a recipient, wherein the file for use as an e-mail attachment is absent from the e-mail message sent from the client to the e-mail server; responsive to receiving the particular e-mail message at the e-mail server, to operate the e-mail server to determine whether the unique identifier is present in the e-mail message; responsive to the unique identifier being present, to attach the file for use as an e-mail attachment to the particular e-mail message at the e-mail server; to operate the e-mail server to send the particular e-mail message with the file for use as an e-mail attachment from the e-mail server to the recipient; and to remove the unique identifier from the particular e-mail message at the e-mail server, before sending the particular e-mail message to the recipient.

16. The data processing system of claim 15, wherein the processor unit further executes the computer usable program code to receive the e-mail attachment at an e-mail server prior to creating an e-mail message containing the unique identifier; associate the e-mail attachment with the unique identifier; and store the e-mail attachment on the e-mail server for later attachment to the e-mail message when the e-mail message is received from the client.

17. The data processing system of claim 16, wherein the e-mail attachment is stored on a same data processing system as the e-mail server.

18. The data processing system of claim 16, wherein a user is located at the client and wherein the processor unit executes computer usable program code to identify all e-mail attachments associated with the user to form the list of e-mail attachments, wherein each e-mail attachment is associated with a corresponding unique identifier; and send the list of e-mail attachments to the client.

19. The data processing system of claim 18, wherein the processor unit further executes the computer usable program code to send the particular e-mail message with the unique identifier from the client to the e-mail server for distribution, wherein the unique identifier is a multipurpose internet mail extension (MIME) identifier.

20. A data processing system for managing e-mail attachments, the data processing system comprising:
> means for uploading a file for use as an e-mail attachment from a client to an e-mail server, wherein the file for use as an e-mail attachment is uploaded independent of any particular e-mail message;
> means for storing the file for use as an e-mail attachment, wherein a unique identifier is associated with the file for use as an e-mail attachment;
> means for presenting, at the particular client, a list of e-mail attachments stored on an e-mail server in communication with the particular client through a communications link;
> means for responsive to a selection at the client of the file for use as an e-mail attachment from the list of e-mail attachments, placing the unique identifier associated with the file for use as an e-mail attachment in the particular e-mail message before the e-mail message is sent from the client to the e-mail server, wherein the file for use as an e-mail attachment was previously uploaded from the client;
> means for sending a particular e-mail message from the client to the e-mail server, for subsequent delivery to a recipient, wherein the file for use as an e-mail attachment is absent from the e-mail message sent from the client to the e-mail server;
> means responsive to receiving the particular e-mail message at the e-mail server, for operating the e-mail server to determine whether the unique identifier is present in the received e-mail message;
> means responsive to the unique identifier being present, for attaching the file for use as an e-mail attachment to the particular e-mail message at the e-mail server;
> means for operating the e-mail server to send the particular e-mail message with the file for use as an e-mail attachment from the e-mail server to the recipient; and
> means for removing the unique identifier from the particular e-mail message at the e-mail server, before sending the particular e-mail message to the recipient.

* * * * *